S. S. HURLBUT.
GRAIN HARVESTER.
No. 7,928.    Patented Feb. 4, 1851.
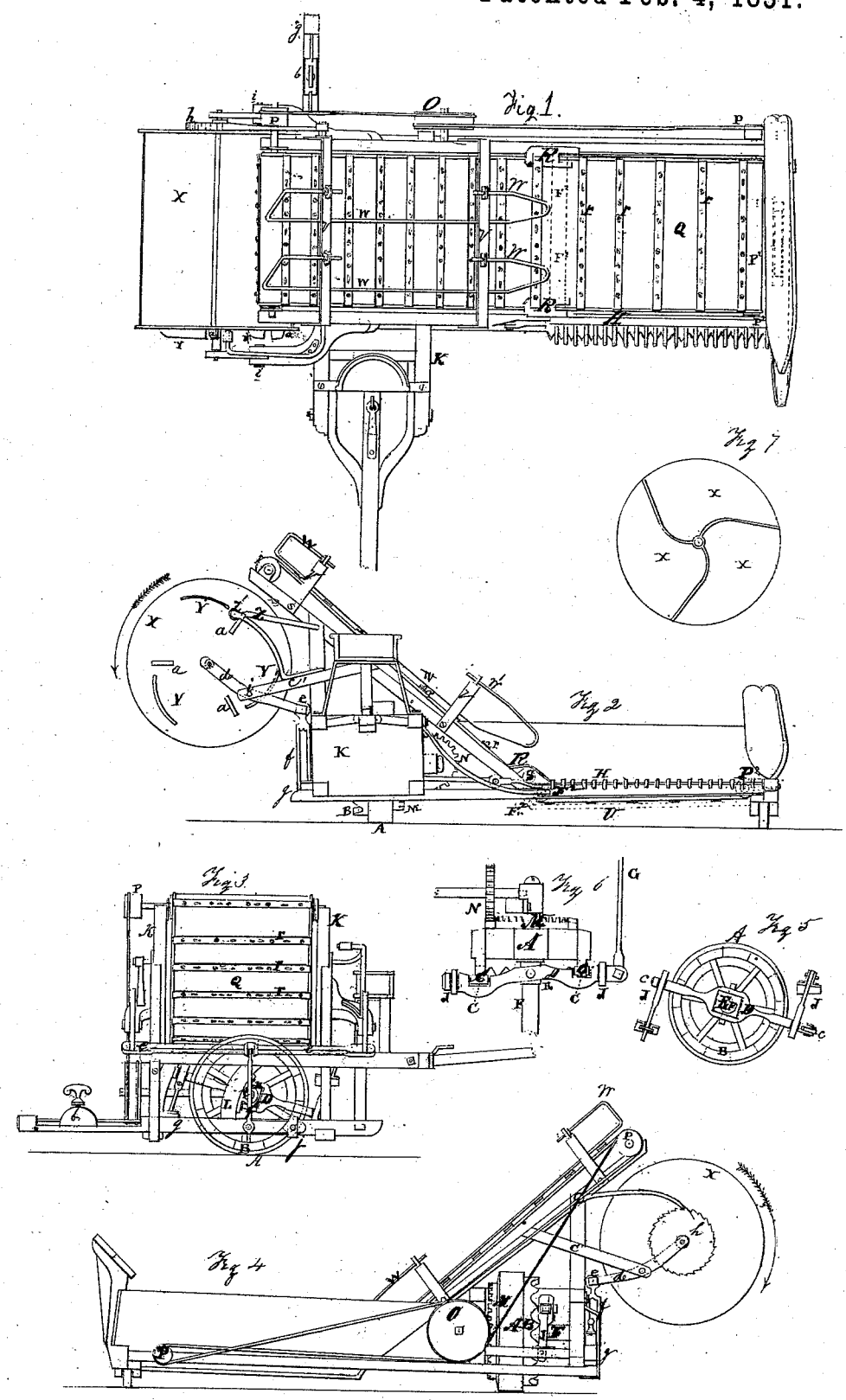

UNITED STATES PATENT OFFICE.

SIDNEY S. HURLBUT, OF RACINE, WISCONSIN.

IMPROVEMENT IN GRAIN-HARVESTERS.

Specification forming part of Letters Patent No. 7,928, dated February 4, 1851.

*To all whom it may concern:*

Be it known that I, SIDNEY S. HURLBUT, of the city and county of Racine, and State of Wisconsin, have invented a new and useful improvement in the machine for cutting, raking, weighing, and depositing grain in sheaves, and known as the "Wisconsin Harvester and Raker;" and I do hereby declare that the following is a full and exact description thereof, reference being had to the accompanying drawings, and to the letters of reference marked thereon, making part of the same.

Figure 1 is a horizontal or bird's-eye view; Fig. 2, front elevation; Fig. 3, end elevation, with weigher removed; Fig. 4, rear elevation; Fig. 5, sectional view of driving-wheel and vibrating bar; Fig. 6, horizontal sectional view of driving-wheel in combination with vibrating bar and pinion for propelling apron; Fig. 7, sectional view of weigher.

Similar letters in the several figures refer to like parts.

The frame K, Fig. 3, containing the cutters H, side and back boards, pole and supporting-wheels for supporting the frame, are so similar to those now generally in use as to need no particular description beyond their connection with the improved portion of the machine.

As my improvement consists of three separate and distinct parts, I will commence with a description of that portion operating upon the cutters.

A, Fig. 4, is the main or driving wheel, upon whose outer face or rim are cast the circle of triangular teeth B, a short distance within the periphery or tread of the wheel, to prevent their coming in contact with the earth while revolving, and thus to avoid clogging while acting upon the two small anti-friction rollers C C, Fig. 6, inserted into and near the ends of the vibrating bar D. The rollers C C play alternately in and out of the spaces between triangular teeth B, and thus insure a regular and uniform vibrating motion through the bar D, Fig. 6, whose axis plays upon a square box, E, Fig. 5, fitted to the main shaft F, Fig. 6. The main shaft revolves in said box and acts as a journal, and thus supports the bar D, which is secured to the box E by two pivot-pins, one on the upper and the other on the lower side of the bar D, as represented in Fig. 5. The bar D is connected to the rod G at its front end, and gives motion to the cutter H, Figs. 1, 3, as soon as the main wheel commences to revolve.

J J are two vibrating arms, the one inserted with a joint into the lower and the other into the upper beam of the frame K, Fig. 3, and permitted to play freely for the purpose of supporting the bar D in an inclined position, and thereby insure regularity of motion to the cutting portion of the machine.

L L, Fig. 3, are two uprights (one hidden by the frame) to support the journals of main shaft F, Fig. 6.

I will now proceed to describe my improvement for conveying, weighing, and depositing the grain or straw as fast as cut by the reaping-machine.

M, Fig. 6, represents a circle of teeth cast upon the inner side of the main wheel A and gearing into a spur-pinion, N, Fig. 6, of about half its diameter, upon the rear end of whose shaft is placed a pulley, O, Fig. 4, with two grooves, in which are inserted two bands or cords, one extending to the lower and the other to the upper rollers, P P, Fig. 4, which pass from the rear to the front of the frame or platform of the machine, for the purpose of propelling the revolving apron Q, Figs. 1 3, upon which are placed laterally and at short distances apart light rakes $r$, fastened securely to it, for the purpose of supporting the grain while ascending the inclined plane caused by elevating the revolving apron after it passes the inner end of the cutter, in order to place the grain in the rotating weigher and depositor.

R R, Figs. 1 and 2, are two guards placed over the rollers S S, Fig. 2, to prevent the rakes from coming in contact with them. The rollers S S are channeled to admit the ropes. The object of the rollers S S is to hold in their proper places the two parallel endless ropes or cords with which the outer edges of the revolving apron are bound at their edges.

$P^2$, Fig. 2, is a small roller placed between the upper and lower portions of the apron to prevent them from rubbing and to give the apron the proper direction to the roller $P^2$. This roller extends across the frame, having channels near its ends to admit the ropes attached to the sides of the apron.

U, Fig. 2, is a shield of sheet-iron, extending from front to rear of platform, to preserve the revolving apron from injury. This is of the usual form and construction, and may or may not be used.

V V, Fig. 2, are two elongated staple-shaped irons, extending across the apron-frame, upon whose upper surface are firmly fastened four loops or eyes of iron, into which are inserted the ends of the two movable rods W W, Fig. 1. These rods receive the grain as soon as it commences to ascend the inclined plane, and, being flexible, gently press upon the grain or straw, and thus prevent the wind from acting upon it until it arrives at the weigher and depositor.

Figs. 1, 2 represent the weigher for weighing and depositing the grain in sheaves upon the ground. It is constructed in the following manner: I take a light shaft of wood, of suitable size, upon each end of which I secure a light head of suitable thickness and diameter, through the center of which I introduce small journals to revolve through holes in the upper ends of the levers $d$ $d$, Fig. 2, whose fulcra are at $i$ $i$, as shown in the drawings. I then insert the ends of fingers similar to those used in the common grain-cradle into the shaft, by boring holes into it, the outer or smaller ends inclining upward in order to hold the grain or straw, and extending out from the shaft only so far as the diameter of the heads. To the under side of these teeth I secure a canvas or other light material, in order to hold any short straw that may be thrown into the weigher. This weigher is divided into three sections or apartments or cells, as shown at X X X. It may be made of light sheet-iron, as represented at Figs. 1, 2, 7, or of any suitable material and shape to answer the intended purpose. Upon the front end of this weigher are shown radial stops $a$ and curved guides Y Y Y, Fig. 2, the latter to give the weigher a proper direction as the weigher ascends. Upon the end of the catch, which is stationary, is placed a small anti-friction roller, $Z'$, intended to relieve the stop $a$ from the catch as soon as the weigher X has received grain or straw enough to form a sheaf and to cause it to gravitate below the end of the catch. The rotating weigher having descended until the stop $a$ is below the roller $Z'$, it immediately revolves one-third of its circumference, deposits the sheaf, and returns to its former position on account of the weight $b$, Fig. 3, preponderating, when it is again arrested by the next radial stop $a$ coming in contact with the catch, and holds it in postion until the succeeding section or cell receives its proper weight of grain, when the weigher again relieves itself as before, and thus the apparatus becomes self-acting.

$C'$ $C'$ are two stationary arms—one made fast to the front and the other to the rear of the frame K—the ends of which act as fulcrums for the levers $d$ $d$, and through the upper end of which levers the journals of the weigher revolve. These levers are hung at their middle by a pin, $i$, passing through them and a mortise in the ends of the stationary arms $C'$ $C'$. The lower ends of these levers are let into a cross-bar, $e$, Fig. 3, extending across the end of the frame, from the middle of which the forked rod $f$, Fig. 3, descends and is attached in a perpendicular direction to the balance-beam $g$, Fig. 3. The weigher X, with its contents, can be regulated, so as to make a sheaf of any desired size or weight by simply sliding the weight $b$, Fig. 3, in or out or nearer to or farther from the fulcrum $j$ of the bar, as the case may require. $h$, Fig. 4, is a ratchet and hand to prevent the rotating weigher from revolving backward and depositing the straw among the machinery of the reaper, placed on the opposite head from that on which the radial stops and curved guides are placed.

Operation of the reaper: This machine, like reapers with reciprocating cutters and drawn by animals, is intended to pass round a field or lot of grain, and gradually work or cut to the center by passing from the right to the left, the cutting side of the machine being presented to the grain. Now, the operation of this improved machine is thus: As fast as the grain is cut by the reciprocating cutters it falls over upon the revolving apron parallel with the rakes attached to it, and is conveyed by said endless apron and rakes until it comes to the flexible holding-rods W W, under which it is conveyed, these rods keeping it pressed upon the apron until it arrives at the top roller of the apron, when it is emptied into the cell of the rotating weigher X, immediately beneath said roller, until it receives a sufficient quantity to form the required sheaf, when the weigher sinks so far as to relieve itself from the catch $Z'$, when the weight of the grain causes the weigher to descend and the weight $b$ to ascend, the weigher at the same time revolving on its axis a part of a circle in order to discharge its load, when it again ascends to its former elevation, the next succeeding section or cell X will be presented to receive another portion of grain sufficient to form a sheaf, which, when received, causes the weigher again to descend and empty its sheaf, as before, and will thus continue to operate as long as the reaper continues to supply it with grain. The cause of the weigher ascending as soon as it discharges itself is from the gravity of the weight $b$ upon the balance-beam $g$, which will preponderate, and descend as soon as the sheaf is discharged; and as soon as the weigher commences to rise the segmental guides Y are brought in contact with the roller $Z'$ on the catch $Z$, and gives the weigher its proper direction, and causes the radial stop $a$ to come in contact with the said roller $Z'$, and thus holds the weigher from turning until it receives its requisite weight of grain, the operation of weighing being somewhat similar to weighing upon the modern balance.

The action upon the cutters of this reaper is of a compound character, and is produced by the triangular teeth B cast upon the outside or face of the driving-wheel, the diameter of the tread of said wheel being considerably greater than the circle in which the triangular teeth are formed, in order to prevent the teeth from coming in contact with the ground. The said triangular teeth act upon the two small rollers C aforesaid, one on each side of the diameter of the wheel, inserted in each end of the bar D, as above described. When one roller passes the point of a tooth on one segment of the wheel, the other is passing the base of another tooth on the opposite side or segment of the wheel, and produces a regular and uniform motion, which is communicated to the cutters through the agency of the vibrating bar by the usual connecting-rod extending from the front end of the bar to the back of the cutters, which insures an even and smooth cut.

Having thus described my improved reaping-machine, I claim—

1. Combining with a reaping-machine a self-acting weighing apparatus for weighing the grain into any required quantity to form sheaves or bundles of a uniform weight, as described, and depositing the same upon the ground in readiness to be tied, while the reaping-machine is drawn forward and cuts the grain, the said weighing apparatus being made adjustive, so as to increase or diminish the size of the bundles at pleasure; and this I claim whether the weighing apparatus be made and arranged as described, or in any other way which is substantially the same, or whether combined with the aforesaid reaping-machine or any other of a similar character.

2. The combination of the bent holders W W with the inclined endless conveyer for holding the grain thereupon while conveying it to the weighing and depositing apparatus, as aforesaid.

In testimony whereof I have hereunto signed my name before two subscribing witnesses.

SIDNEY S. HURLBUT.

Witnesses:
WM. P. ELLIOT,
THOS. SINCLAIR, Jr.